United States Patent [19]
Gabrius et al.

[11] Patent Number: 6,082,032
[45] Date of Patent: Jul. 4, 2000

[54] LIGHTING TRACK MOUNTABLE INTERNALLY ILLUMINATED SIGN HAVING IMPROVED HOUSING CONSTRUCTION

[75] Inventors: Algimantas Gabrius, Carol Stream; Peter F. Wachter, Northfield; Franklin Fong, Wheeling, all of Ill.

[73] Assignee: Juno Manufacturing, Inc., Des Plaines, Ill.

[21] Appl. No.: 09/004,652

[22] Filed: Jan. 8, 1998

Related U.S. Application Data

[63] Continuation-in-part of application No. 08/857,144, May 15, 1997.

[51] Int. Cl.⁷ .................................................. G09F 13/04
[52] U.S. Cl. .................................................. 40/572; 40/575
[58] Field of Search ........................... 40/570, 572, 575; 411/386

[56] References Cited

U.S. PATENT DOCUMENTS

| | | | |
|---|---|---|---|
| 2,155,936 | 4/1939 | Fuller ........................................ | 40/572 |
| 3,362,737 | 1/1968 | Cobb ................................... | 411/386 X |
| 3,562,942 | 2/1971 | Mabrey ..................................... | 40/570 |
| 4,232,497 | 11/1980 | Meschnig ............................ | 411/386 X |
| 4,274,324 | 6/1981 | Giannuzzi ............................ | 411/386 X |
| 4,903,423 | 2/1990 | Hinca ..................................... | 40/575 X |
| 4,953,067 | 8/1990 | Moore ..................................... | 40/575 X |
| 5,048,210 | 9/1991 | Taylor et al. .............................. | 40/575 |
| 5,306,091 | 4/1994 | Zaydel et al. ........................ | 411/386 X |
| 5,665,938 | 9/1997 | Boshear et al. ........................ | 40/572 X |
| 5,729,924 | 3/1998 | Reading ................................ | 40/572 X |

Primary Examiner—Joanne Silbermann
Attorney, Agent, or Firm—Anthony S. Zummer

[57] ABSTRACT

An internally illuminated sign includes an adapter for mechanical and electrical connection to a lighting track. A display housing is connected to the adapter. The display housing has a face with a message window in the face. A translucent message assembly is removably mounted in the housing adjacent to the window. An illumination source is mounted in the housing adjacent to the side of the translucent message assembly positioned away from the window to enhance visibility of a message in the message assembly. The display housing has a separable portion selectively relocatable relative to the remainder of the housing. Relocation of the separable portion away from the remainder of the housing provides access to the interior of the housing for selective insertion into or removal from the housing the message assembly. A lock releasably secures the separable portion to the remainder of the housing. An arrester is connected to the separable portion and the remainder of the housing to limit the spacing of the separable portion away from the remainder of the housing.

15 Claims, 5 Drawing Sheets

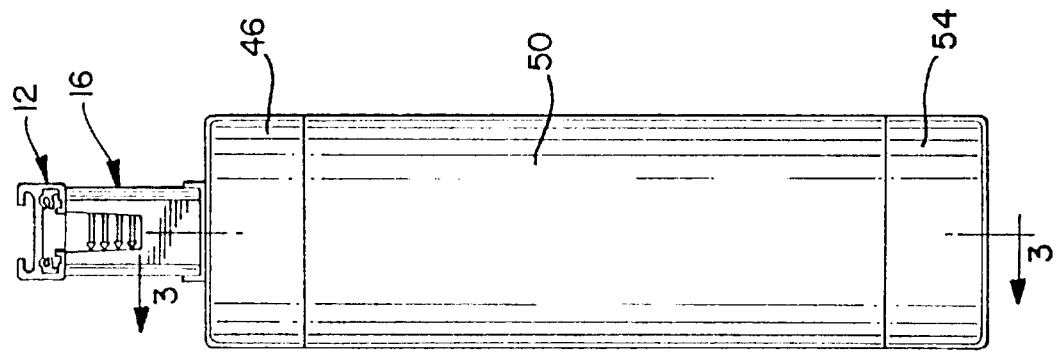
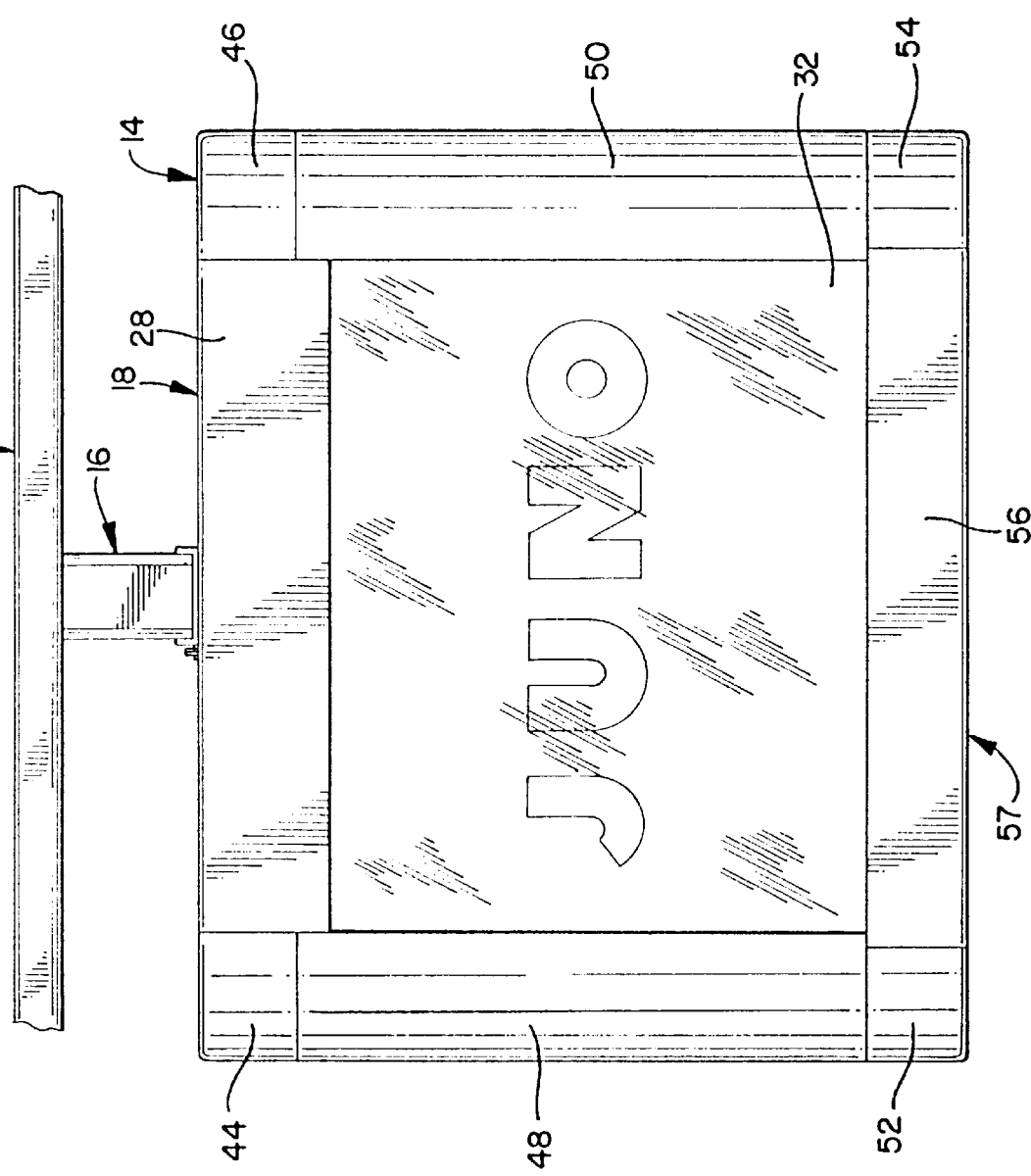

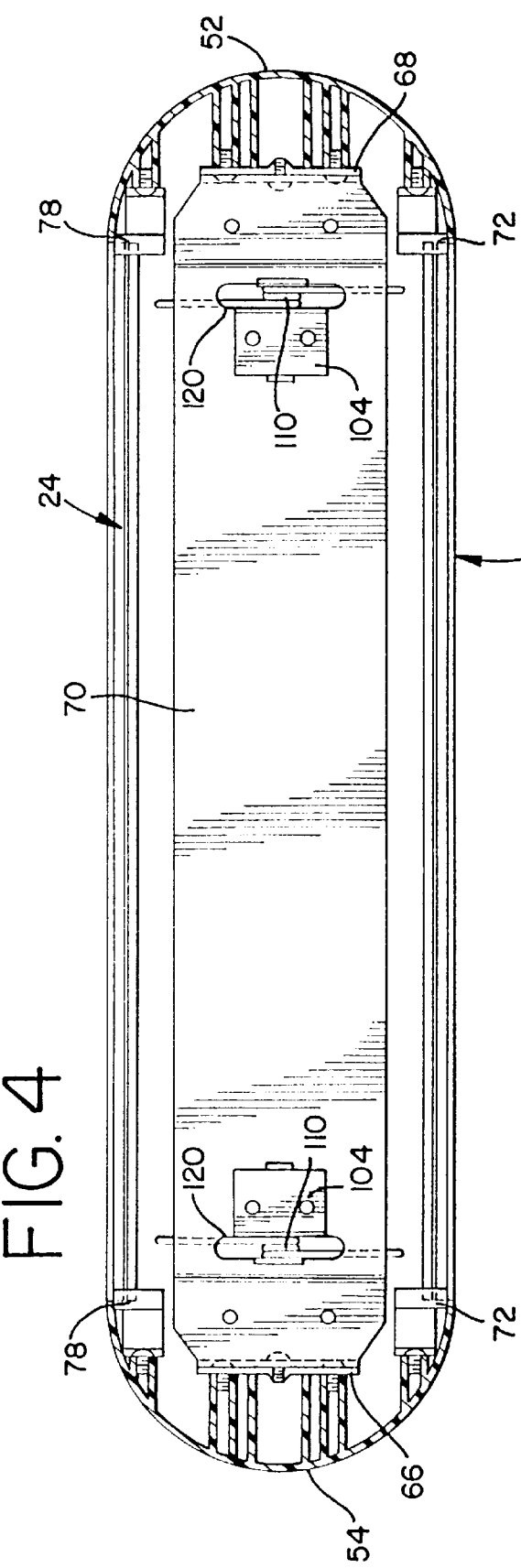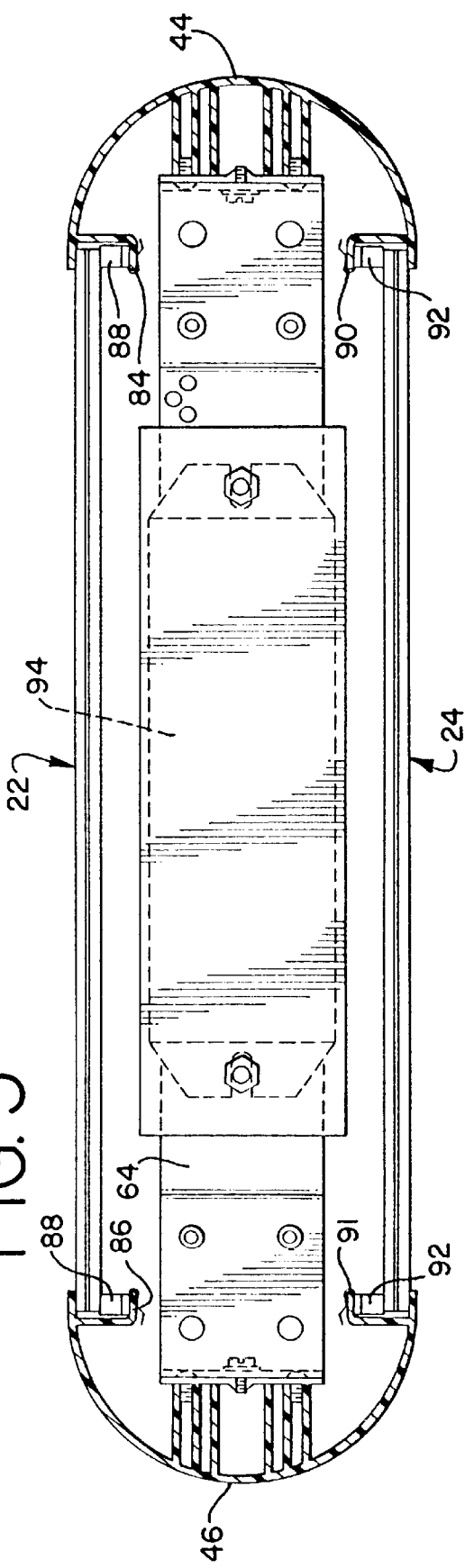

LIGHTING TRACK MOUNTABLE INTERNALLY ILLUMINATED SIGN HAVING IMPROVED HOUSING CONSTRUCTION

CROSS REFERENCE TO RELATED APPLICATION

This application is a continuation-in-part of patent application Ser. No. 08/857,144, filed May 15, 1997, entitled, "Internally Illuminated Sign Mountable On A Lighting Track".

BACKGROUND OF THE INVENTION

Track lighting is used in many commercial establishments to allow sources of light to be repositioned periodically to highlight different areas or subjects. It is also desirable to provide selected information in a selected area. An informative sign with internal illumination is mounted on track lighting to deliver a given message at one location. The sign may be relocated, and the message is changed in the sign to display a different message at another location. Efficiency requires that the displayed message must be readily changed by a relatively unskilled individual without the use of tools. The sign must be one which is essentially self-contained to provide the maximum efficiency and flexibility.

SUMMARY OF THE INVENTION

An internally illuminated sign is selectively mountable on a lighting track. The sign includes an adapter for mechanical and electrical connection to the lighting track. A display housing is connected to the adapter and is supported by the adapter. The housing has a face with a message window in the face. A translucent message assembly is removably mounted in the housing adjacent to the window. An illumination source is mounted in the housing adjacent to the side of the translucent message assembly away from the face to enhance visibility of a message in the message assembly. The housing has a separable portion selectively relocatable relative to the remainder of the housing to provide access to the interior of the housing. The access provides the message assembly with capability of selective insertion into or removable from the housing. A lock releasably secures the separable portion to the remainder of the housing. An arrester is connected to the separable portion and to the remainder of the housing to limit spacing of the separable portion away from the remainder of the housing.

BRIEF DESCRIPTION OF THE DRAWINGS

FIG. 1 is a front elevational view of an internally illuminated sign embodying the herein disclosed invention mounted on a conventional lighting track;

FIG. 2 is an end view of the internally illuminated sign of FIG. 1 showing an end view of the track;

FIG. 4 is an enlarged cross sectional view of the lower portion of the internally illuminated sign of FIG. 3 with a separable portion of the housing spaced away from the remainder of the housing;

FIG. 5 is an enlarged fragmentary cross sectional view of a lock releasably securing the separable portion to the remainder of the housing;

DETAILED DESCRIPTION OF THE PREFERRED EMBODIMENT

Figure 3:
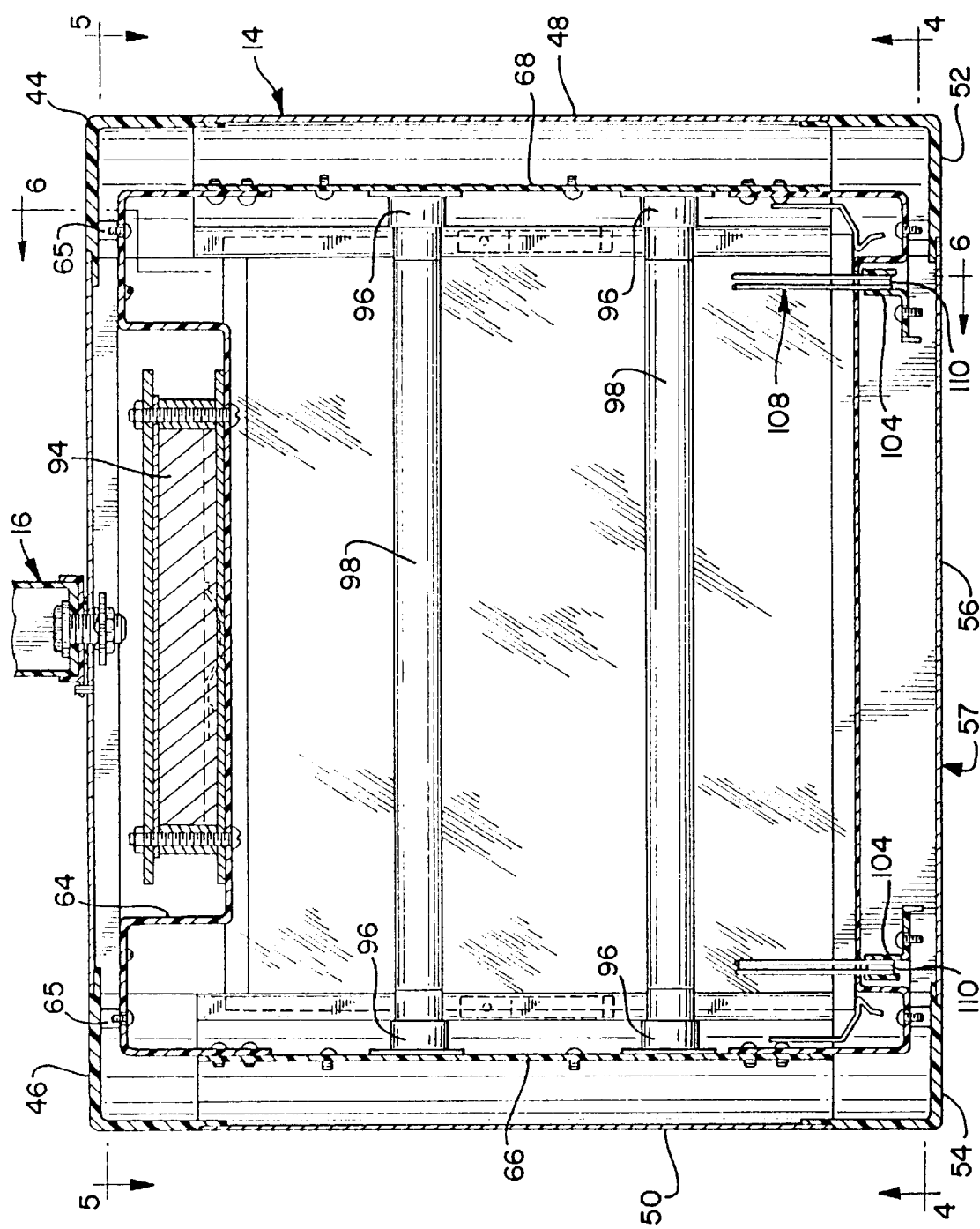
FIG. 3 is a cross sectional view taken on line 3—3 of FIG. 2.
Figure 6:
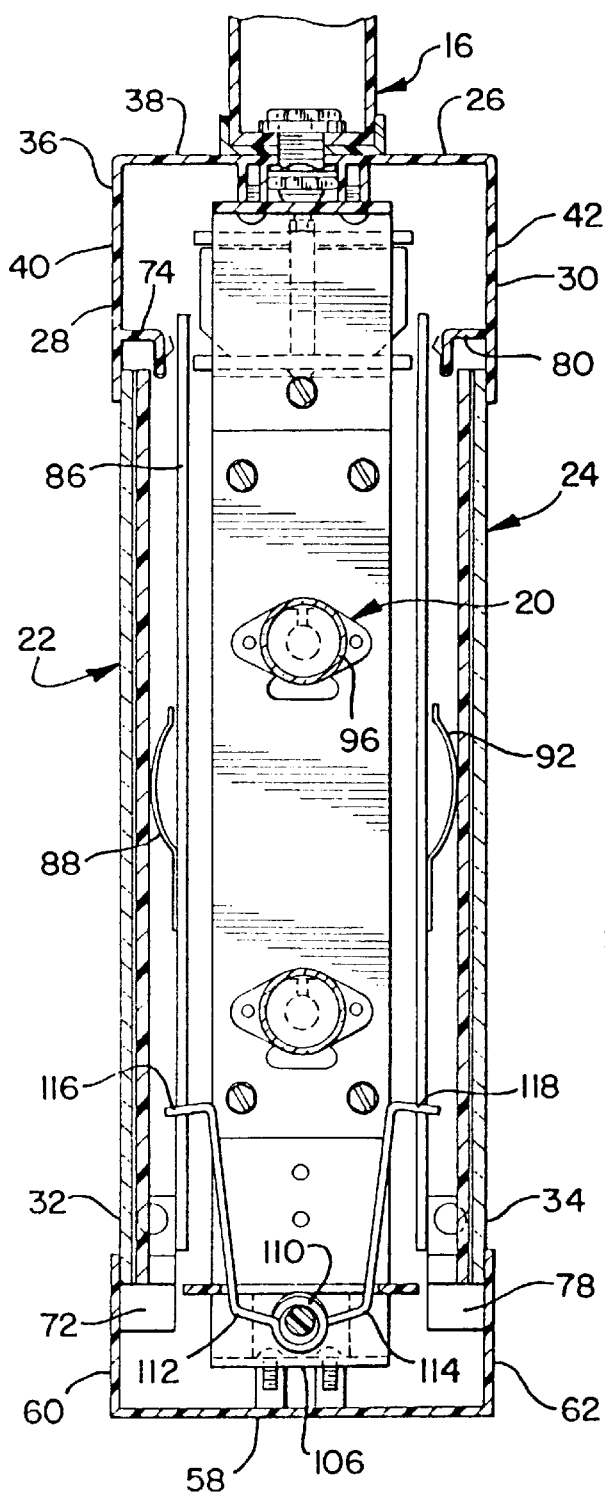
FIG. 6 is an enlarged fragmentary cross sectional view similar to FIG. 5, but showing the separable portion spaced from the remainder of the housing.
Figure 7:
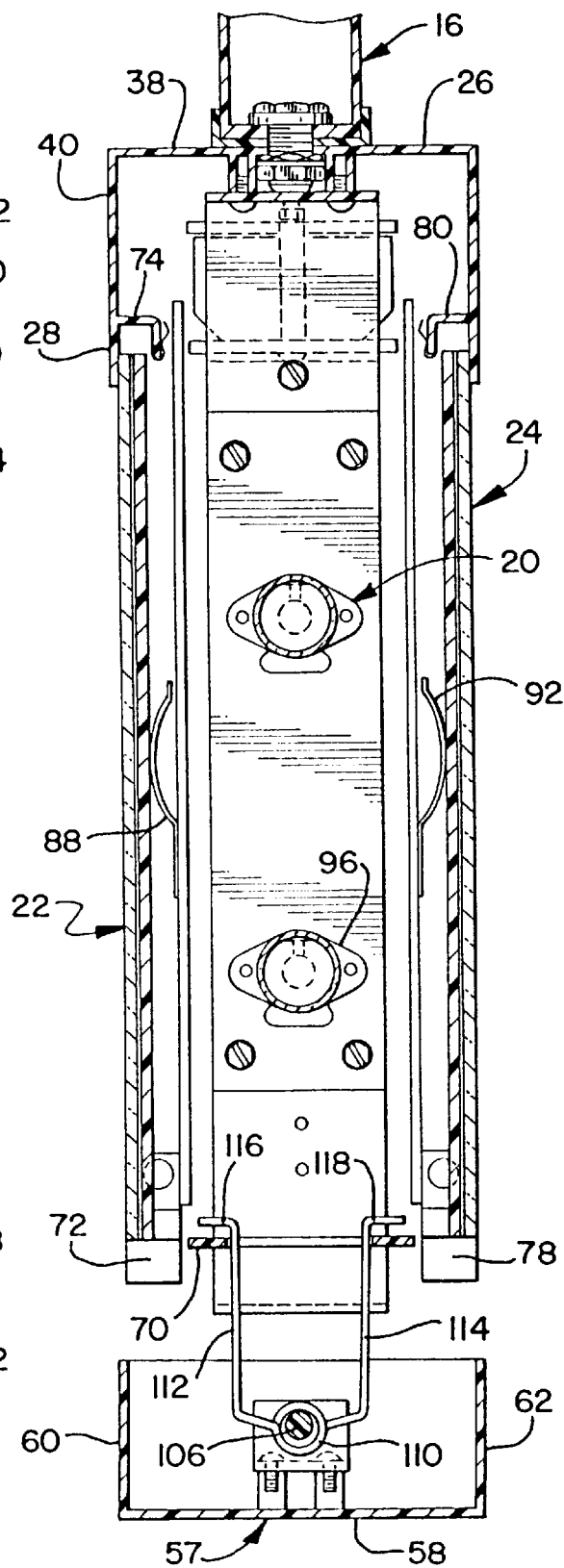
FIG. 7 is a cross sectional view taken on Line 7—7 of FIG. 3.
Figure 8:
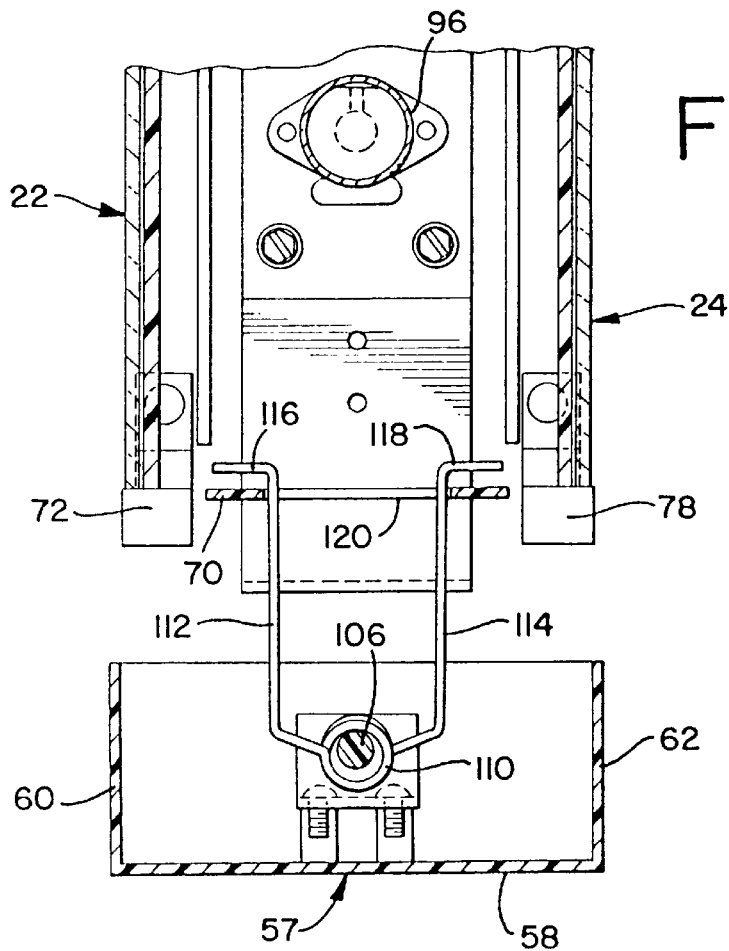
FIG. 8 is a cross sectional view taken on Line 8—8 of FIG. 3.

Referring now to the drawings, and especially to FIG. 1, a conventional lighting track 12, which is part of a conventional track lighting system, is shown therein with an internally illuminated sign 14 electrically and mechanically connected to the track. Sign 14 is a specific embodiment of the subject invention and generally includes a conventional and well known adapter 16 mechanically and electrically connected to the track to support the sign and to connect the sign to a source of electric power. A display housing 18 is mechanically and electrically connected to the adapter and supported thereby. An illumination source 20 is mounted in the housing. Identical translucent message assemblies 22 and 24 are mounted in the housing. Message assemblies 22 and 24 are back lighted by illumination source 20 to enhance visibility of a message contained in each message assembly.

Display housing 18 includes a separable portion 26 and a remainder portion 28. The remainder portion includes a top 30 with a vertical face 32 connected to one edge of the top and a vertical face 34 parallel to face 32 connected to the other and opposite parallel edge of the top. Vertical face 32 includes a message window 36 and vertical face 34 includes a message window 38. The top includes a top section 40 which is an extruded aluminum piece having a flat upper section 42 and a pair of side sections 44 and 46. A plastic end cap 48 is fixed to one end of the top section and a like plastic end cap 50 is fixed to the other end of the top section. Flat section 42 and the tops of end caps 48 and 50 cooperate to define top 30. Extruded aluminum sides 52 and 54 are connected to top caps 48 and 50, respectively.

Separable portion 26 includes bottom caps 56 and 58 which are like caps 48 and 50. Bottom caps 56 and 58 are fixed to an extruded aluminum bottom central portion 60. The separable portion 26 is removably mounted in engagement with sides 52 and 54. Bottom central portion 60 includes a flat bottom 62 and a pair of integral bottom sides 64 and 66, so that central portion has an elongated body having a U-shaped cross section with the bottom caps 56 and 58 mounted on opposite sides. Bottom sides 64 and 66 cooperate with respective sides 44 and 46 of the top section to define windows 36 and 38, respectively. Bottom sides 64 and 66 have ledges 68 and 70, respectively, formed therein.

Figure 9:
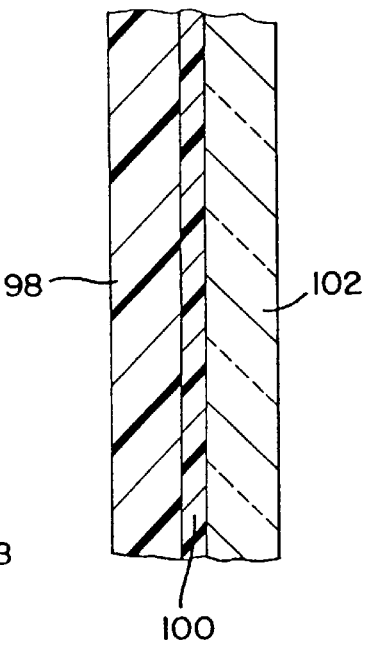
FIG. 9 is a cross sectional view of an end portion of the internally illuminated sign taken on Line 9—9 of FIG. 3.
Figure 10:
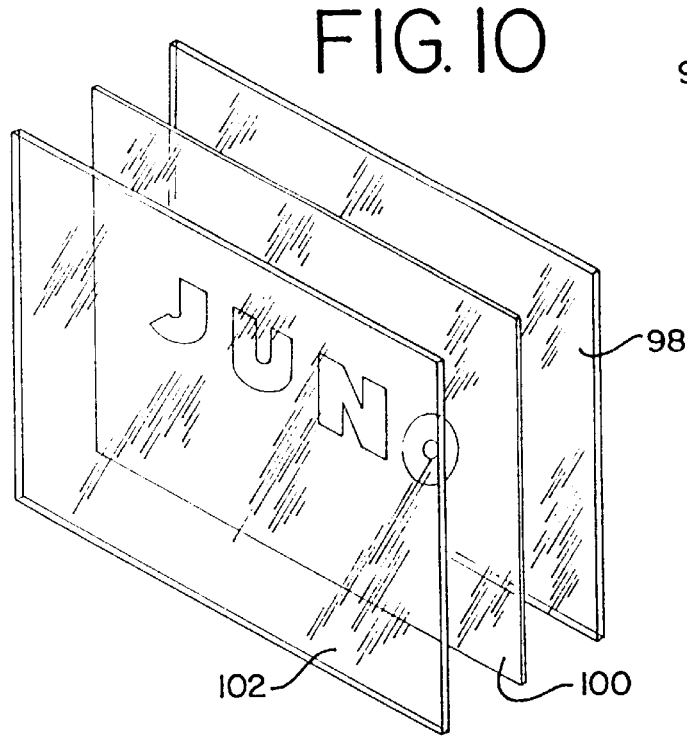
FIG. 10 is a cross sectional view similar to FIG. 9, but showing the separable portion spaced away from the remainder of the housing of the internally illuminated sign.

A ballast bracket 72 is mounted in top 30. The ballast bracket is connected to top caps 48 and 50 by conventional screws 74. An end plate 76 is connected to one end of ballast bracket 72 and a second end plate 78 is connected to the opposite end of the ballast bracket, as may be best seen in FIG. 3. A support plate 80 is connected to end plates 76 and 78. As may be seen in FIG. 9, ledge 68 supports message assembly 22, and ledge 70 supports message assembly 24. A message assembly inverted trough 81 is formed intergral with one side of sides 52 and 54 and receives the top portion of message assembly 22. In a like manner, a message assembly inverted trough 82 is connected to one side of sides 52 and 54 to receive message assembly 24. Stabilizing edges 84 and 86 are formed in sides 52 and 54, respectively. Each of the stabilizing edges has a leaf spring 88 mounted thereon in engagement with an opposed edge of message assembly 22 to hold the message assembly adjacent to window 36 and thereby provide a resilient message assembly holding means. In a like manner, two stabilizing edges 90 and 92 are formed on the opposite side of sides 52 and 54, respectively, with a leaf spring 94 mounted on each of the edges 90 and 92 in engagement with message assembly 24 to hold resiliently the message assembly adjacent to window 38, and thereby provide a second resilient message assembly holding means.

Light source 20 includes a conventional ballast 96 mounted on bracket 72. The ballast is connected to the track through adapter 16 by conventional wiring which is not shown herein. The ballast is also connected to four fluorescent tube receptacles 98 which receive and hold conventional fluorescent tubes 100.

Message assemblies 22 and 24 are identical to each other in their construction. Each message assembly includes a translucent layer or sheet 102 which is a diffuser layer adapted to be positioned adjacent to the fluorescent tubes to diffuse light from the tubes. In this instance, the layer is milk white. However, any other suitable diffuser may be utilized. A message layer 104 is a translucent film which has a message formed in the film. Illustrative of a message on the film is the word "JUNO" shown formed on the film in a conventional and well known manner. The message may be; a word or words, a pictorial message or a combination therein. A transparent guard layer 106 is positioned adjacent to the message layer to protect the message layer. The three layers are parallel to each other with the message layer sandwiched between the guard layer and the diffuser layer.

Separable portion 26 is releasably secured to the remainder portion 28 by a releasable lock. The lock includes a pair of identical screw locks 108 and 110. Each of the screw locks includes an elongated fastener being a lock screw 112 rotatably mounted in a screw aperture 114 in its respective bottom cap. Each lock screw has a threaded shank portion 116 extending to one end and a knurled head 118 formed on the opposite end. A lock collar 120 is mounted on each lock screw between the threaded portion 116 and knurled head 118. A washer 122 is positioned between the knurled head and aperture 114. Thus, the lock screw is free to rotate in the aperture, but is free to move axially only a limited short distance. The lock screw is restrained by the collar in one direction and by the washer and head in the other direction.

A receptacle lock 124 is mounted on support plate 80 for connection to each lock screw. The receptacle lock includes a threaded receptacle 126 for mateable engagement with the threaded portion 116 of the respective screw. The receptacle lock includes a fastener guide 128 formed integral with the threaded receptacle for mateably receiving the end of the threaded portion to guide the threaded portion of the lock screw toward the threaded receptacle.

The separable portion 26 is limited in its distance of spacing from the remainder of the housing by a pair of identical arresters 130. Each arrester includes a connector which in this instance includes a flexible cable 132. Each cable has a moveable end 134 which is secured to the separable portion 26 by a screw 136. The opposite end of the cable is a fixed end 138 which is secured to the support plate 80 by a conventional screw 140.

The message assemblies in the instant sign may be easily removed from the display housing to change the message layer. The message assemblies are then replaced after the message layer is changed. Screws 112 are easily removed from their respective threaded receptacles by grasping the respective knurled head 118 and manually turning the screw. Release of the screws allows the separable portion to be dropped down from remainder portion 28. The ledges 68 and 70 are thus removed from a position of supporting engagement with the respective message assemblies 22 and 24. However, the message assemblies are retained in place by the respective resilient message assembly holding means. The arresters retain the separable portion adjacent to the remainder portion to limit spacing of the separable portion away from the remainder portion but allows access to the message assemblies. Each message assembly is pulled down out of its respective vertical face. The film in each assembly is changed to change the message. Once the film has been changed and the respective translucent sheet and guard layer are reassembled, the message assembly is reinserted into the remainder portion of the housing by sliding the message assembly upward between the respective stabilizing edges for engagement with the respective leaf springs. The leaf springs retain the message assembly in position until the separable portion is placed into position in engagement with the remainder portion whereby the ledges are positioned in supporting engagement with respective message assemblies. Each of screws 112 is then positioned in its respective receptacle lock. Each fastener guide facilitates the insertion of the respective screw into contact with the respective threaded receptacle 126 so that the screw may be easily tightened into position to hold the separable portion in mateable contact with the remainder portion.

The message assemblies may be readily serviced and the messages changed without the use of any tools. The construction is simple so that a relatively untrained person may remove the message assemblies from the display housing to change the message and reinsert the messages assemblies in the display housing.

Although a specific embodiment of the herein disclosed invention has been shown in the accompanying drawings and described in detail above, it is to be expressly understood that the illustration and description of the preferred embodiment is solely for purposes of illustration and the scope of the present invention is limited only by the appended claims.

What is claimed is:

1. An internally illuminated sign for mounting on a lighting track comprising; an adapter for mechanical and electrical connection to a lighting track, a display housing connected to the adapter, said display housing having a message window, a translucent message assembly removably mounted in the housing adjacent to the message window, an illumination source mounted in the housing adjacent to the side of translucent message assembly positioned away from the window to enhance visibility of a message in the message assembly, said housing having a separable portion selectively relocatable relative to the remainder of the housing to provide access to the interior of the housing for selective insertion into or removal from the housing said message assembly, a lock releasably securing the separable portion to the remainder of said housing, and an arrester connected to the separable portion and the remainder of the housing to limit the spacing of the separable portion away from the remainder of the housing.

2. An internally illuminated sign for mounting on a lighting track as defined in claim 1, wherein the lock includes a threaded fastener rotatably mounted in the separable portion and threadedly connectable to a portion of the remainder of the housing for releasably locking the separable portion to the remainder of the housing.

3. An internally illuminated sign for mounting on a lighting track as defined in claim 1, wherein the arrester includes an elongated flexible connector having one end secured to the separable portion and the other end of the connector secured to a portion of the remainder of the housing.

4. An internally illuminated sign for mounting on a lighting track as defined in claim 1, wherein the separable portion is a bottom of the housing, said separable portion including an elongated body having a U-shaped cross section and a cap mounted on each of opposite ends of the body.

5. An internally illuminated sign for mounting on a lighting track as defined in claim 1, wherein the lock includes a threaded fastener rotatably mounted in the separable portion, a threaded receptacle mounted on the remainder of the housing, said threaded receptacle mateable with the threaded fastener, and a fastener guide positioned between the threaded receptacle and the separable portion to facilitate insertion of the threaded fastener into the threaded receptacle.

6. An internally illuminated sign for mounting on a lighting track as defined in claim 1, wherein said separable portion includes an elongated body having a U-shaped cross section and a cap mounted on each of opposite ends of the body, said lock includes a threaded fastener rotatably mounted in one of said caps and threadedly connectable with a portion of the remainder of the housing, and said arrester includes an elongated flexible connector having one end secured to the separable portion and the other end secured to a portion of the remainder of the housing.

7. An internally illuminated sign for mounting on a lighting track as defined in claim 1, wherein the separable portion is a bottom of the housing, said separable portion including an elongated body having a U-shaped cross section, a cap mounted on each of opposite ends of the body, said lock includes a threaded fastener rotatably mounted in each of the caps, each of the threaded fasteners threadedly engageable with a portion of the remainder of the housing for releasably locking the separable portion to the remainder of the housing.

8. An internally illuminated sign for mounting on a lighting track as defined in claim 1, wherein the separable portion is a bottom of the housing, said separable portion includes an elongated body having a U-shaped cross section, a cap mounted on each of opposite ends of the body, said arrester includes two elongated flexible connectors, each connector having one end secured to a respective end of the elongated body, each of the connectors having another end secured to a portion of the remainder of the housing.

9. An internally illuminated sign for mounting on a lighting track as defined in claim 1, wherein the lock includes a threaded fastener rotatably mounted in the separable portion and axially restrained therein, a threaded receptacle mounted on the remainder of the housing selectively mateably engageable with the threaded fastener, a fastener guide connected to the remainder of the housing positioned between the threaded receptacle and the separable portion to facilitate positioning the threaded fastener in the threaded receptacle, and said arrester includes an elongated flexible connector having one end fixed to the separable portion and the other end fixed to the remainder of the housing.

10. An internally illuminated sign for mounting on a lighting track as defined in claim 1, wherein said lock includes an elongated fastener rotatably mounted in the separable portion and being held therein, said elongated fastener having a threaded part, a threaded receptacle fixed to the remainder of the housing and being mateable with the threaded part of the fastener, and said arrester includes an elongated flexible connector having one end connected to the separable portion and another end secured to the remainder of the housing.

11. An internally illuminated sign for mounting on a lighting track as defined in claim 1, wherein the separable portion is a bottom of the housing, said separable portion including an elongated body having a U-shaped cross section, a cap mounted on each of opposite ends of the body, said lock includes a threaded fastener rotatably mounted in each of the caps, a threaded receptacle mateable with each of the threaded fasteners, each of said threaded receptacles mounted on the remainder of the housing, and a fastener guide positioned between each threaded receptacle and the respective part of the separable portion to facilitate insertion of each threaded fastener into its respective threaded receptacle.

12. An internally illuminated sign for mounting on a lighting track as defined in claim 1, wherein the separable portion is a bottom of the housing, said separable portion including an elongated body having a U-shaped cross section, a cap mounted on each of opposite ends of the body, said lock includes a threaded fastener rotatably mounted in each of the caps, each of the threaded fasteners is threadedly connectable with a portion of the remainder of the housing, and said arrester including a pair of elongated flexible connectors, each of said connectors having one end secured to the elongated body adjacent to a respective cap and another end secured to a portion of the remainder of the housing.

13. An internally illuminated sign for mounting on a lighting track as defined in claim 1, wherein the lock includes an elongated threaded fastener rotatably mounted in the separable portion and being held therein, said threaded fastener having a threaded end, a threaded receptacle fixed to the remainder of the housing, said threaded receptacle threadedly mateable with the threaded end of the fastener for securing the separable portion to the remainder of the housing, a fastener guide connected to the remainder of the housing positioned between the threaded receptacle and the separable portion for receiving the threaded end of the fastener to guide the threaded end of the fastener toward the threaded receptacle, a knob mounted on an end of the threaded fastener spaced away from the threaded end to provide a convenient means for manually rotating the fastener, and said arrester being an elongated flexible cable having one end secured to the separable portion and another end secured to the remainder of the housing.

14. An internally illuminated sign for mounting on a lighting track as defined in claim 1, wherein said separable portion includes an elongated body having a U-shaped cross section and a cap mounted on each of opposite ends of the body, said lock includes an elongated threaded fastener rotatably mounted in each of said caps, each of said threaded fasteners being axially restrained in the respective cap, each of said threaded fasteners having a threaded end, a threaded receptacle fixed to the remainder of the housing threadedly mateable with a respective threaded end of one of said threaded fasteners for securing the separable portion to the remainder of the housing, a fastener guide connected to the remainder of the housing positioned between each of the threaded receptacles and the separable portion for receiving the respective threaded end of the respective fastener to guide the threaded end of the fastener toward the respective threaded receptacle, a knob mounted on an end of each of the threaded fasteners spaced away from the respective threaded end to provide a convenient means for manually rotating the respective fastener, and said arrester being an elongated flexible cable having one end secured to the separable portion and another end secured to the remainder of the housing.

15. An internally illuminated sign for mounting on a lighting track as defined in claim 1, wherein the separable portion is a bottom of the housing, said separable portion includes an elongated body having a U-shaped cross section, a cap mounted on each of opposite ends of the body, said lock includes an elongated threaded fastener rotatably mounted in each of the caps, each of said threaded fasteners axially restrained in its respective cap, each of said threaded fasteners having a threaded end, a threaded receptacle fixed to the remainder of the housing, said threaded receptacle being threadedly mateable with the threaded end of its respective fastener for securing the separable portion to the remainder of the housing, a fastener guide connected to the remainder of the housing positioned between each of the respective threaded receptacles and the separable portion for receiving the respective threaded end of the fastener to guide the threaded end of the fastener toward the respective threaded receptacle, a knob mounted on an end of each threaded fastener spaced away from the threaded end to provide a convenient means for manually rotating the fastener, and said arrester including a pair of flexible cables, each of said cables having one end secured to the elongated body adjacent to a respective cap and another end secured to the remainder of the housing.

* * * * *